United States Patent [19]
Haring et al.

[11] Patent Number: 5,903,081
[45] Date of Patent: May 11, 1999

[54] SQUIRREL-CAGE INDUCTION MOTOR

[75] Inventors: Tapio Haring; Jarkko Iisakkala, both of Vaasa, Finland

[73] Assignee: ABB Motors Oy, Vaasa, Finland

[21] Appl. No.: 08/994,944

[22] Filed: Dec. 19, 1997

[30] Foreign Application Priority Data

Dec. 31, 1996 [FI] Finland ..................................... 965302

[51] Int. Cl.$^6$ .................................................. H02K 71/42
[52] U.S. Cl. ............................ 310/168; 310/160; 310/125
[58] Field of Search ..................... 310/168, 160, 310/125

[56] References Cited

U.S. PATENT DOCUMENTS 1,725,662  8/1929  Merrill ..................................... 310/160

Primary Examiner—Nestor Ramirez
Assistant Examiner—Thanh Lam
Attorney, Agent, or Firm—Watson Cole Grindle Watson P.L.L.C.

[57] ABSTRACT

The present invention relates to a squirrel-cage induction motor for frequency converter use, in particular, which squirrel-cage induction motor comprises a stator, a stator winding arranged in its axial grooves, divided into at least two coil groups for each phase of the supplying alternating current and connected to the supplying alternating current in such a manner that the sum of basic frequency groove currents is substantially zero at each moment. In accordance with the invention, one half of the coil groups of each phase is connected to the supplying alternating current at one end of the stator and the other half of the coil groups of each phase at the other end of the stator.

4 Claims, 2 Drawing Sheets

SQUIRREL-CAGE INDUCTION MOTOR

The present invention relates to a squirrel-cage induction motor for frequency converter use, in particular, which squirrel-cage induction motor comprises a stator, a stator winding arranged in its axial grooves, divided into at least two coil groups for each phase of the supplying alternating current and connected to the supplying alternating current in such a manner that the sum of basic frequency groove currents is substantially zero at each moment; and a rotor arranged to rotate with respect to the stator.

Recently, bearing damages to squirrel-cage induction motors supplied by frequency converters have increased and the reason is found to be the effect of frequency converter use on voltage and current stress directed to bearings. It has been found in practical measurements that frequency converters generate three different types of voltages that influence the bearing. The voltages can be divided into capacitive and inductive voltages by their coupling mechanism. In an inductive coupling, the common-mode current circulating in the electric circuit formed by the motor, the frequency converter and grounding generated by a common-mode voltage induces a voltage between the ends of the shaft due to a non-symmetrical capacitive current loss in the motor, the size of the voltage being dependent on the amplitude of the current and its rate of change. They, in turn, are dependent on the rate of the voltage rise of power components in the frequency converter and on the stray capacitances of the common-mode electric circuit and other effective impedances. The voltage generates a current circulating through the bearings and the frame between the ends of the shaft of the motor. The magnitude of the current depends on the impedances of the bearing electric circuit and the magnitude of the grounding current.

A squirrel-cage induction motor is usually constructed in such a manner that all the connection wires are conveyed to the coil end of the stator winding at the D end of the motor and then supplied to winding portions passing in the stator grooves. The stray capacitance between the winding and the frame, visible to the low frequency currents, is very small, wherefore no longitudinal capacitive current loss will occur and the sum of the groove currents of the motor is zero at each moment.

However, a high-frequency zero current behaves in a different way. As the current flows from the winding to the grounded frame through spatially distributed stray capacitance, the longitudinal high-frequency current distribution of the motor is non-symmetrical. That is, if all the currents of all the stator grooves are added up, their sum is not zero. The axial net current generates to the air gap a corresponding high-frequency zero flux which encircles the shaft. As the shaft is now surrounded by a varying magnet flux, a voltage is induced to it on the basis of the law of induction, the current generated by the voltage trying to oppose the changes in the flux in case the electric circuit closes through the bearings and the frame.

SUMMARY OF THE INVENTION

The object of the present invention is to provide a squirrel-cage induction motor where a voltage generated by a high-frequency net current is not generated between the ends of the shaft and thus the current causing damages to the bearings will not flow through the bearings.

The above object is attained with the squirrel-cage induction motor of the invention, which is characterized in that one half of the coil groups of each phase is connected to the supplying alternating current at one end of the stator and the other half of the coil groups of each phase at the other end of the stator.

The idea of the solution of the invention is that a high-frequency net current is made to flow in the winding as if against itself, in which case its inductive effect respective to the shaft will be cancelled out. As the winding is anyway connected in such a manner that the sum of its basic frequency groove currents, the direction taken into consideration, is similar to that of a conventional motor, that is, such that the sum of the basic frequency groove currents of the stator is at each moment substantially zero, its electric performance is otherwise totally similar to that of a conventional winding.

BRIEF DESCRIPTION OF THE DRAWINGS

In the following, the squirrel-cage induction motor of the invention will be explained in more detail with reference to the appended drawings, wherein.

DESCRIPTION OF THE INVENTION

Figure 1:
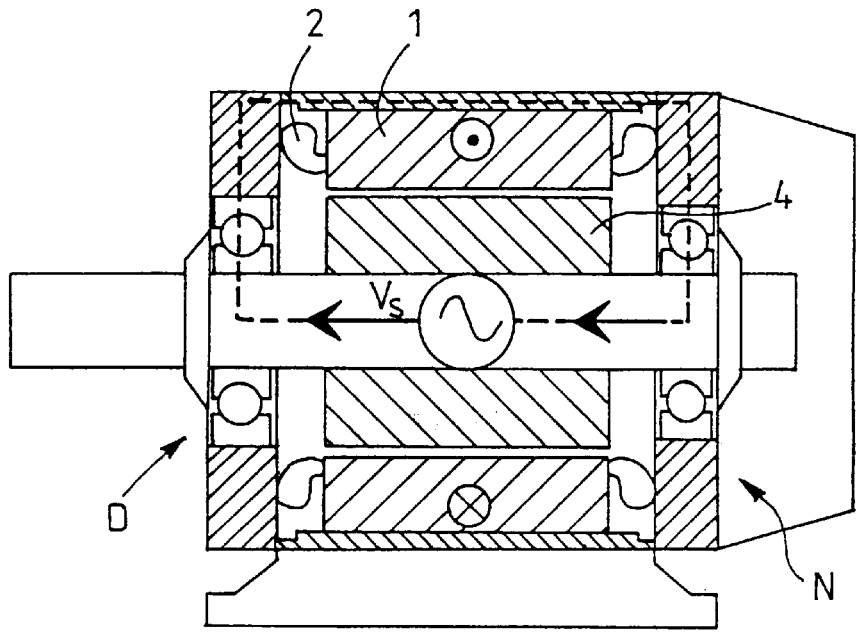
FIG. 1 is a schematic, sectional view of a conventional squirrel-cage induction motor.
Figure 3:
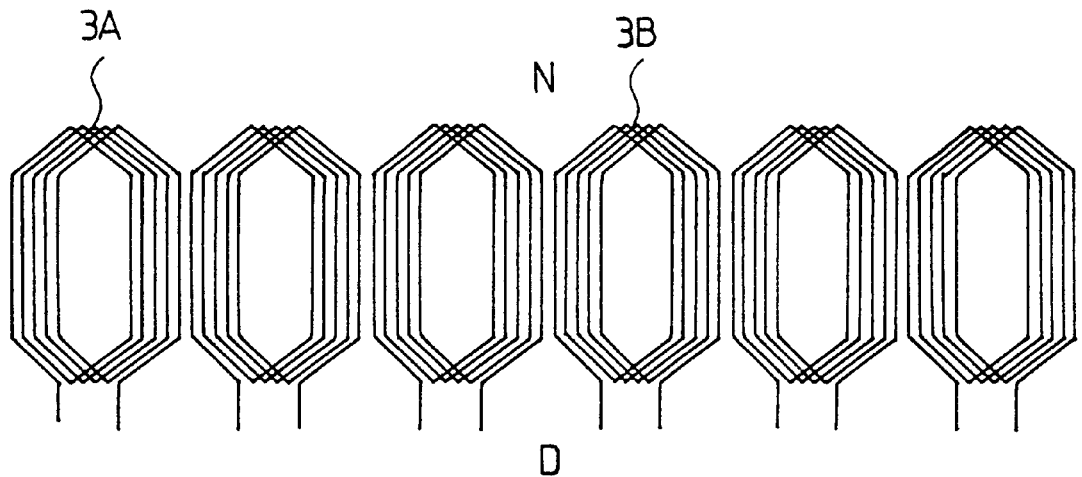
FIG. 3 shows a prior art method for connecting coil groups of a stator winding.

FIG. 1 is a sectional view of a conventional squirrel-cage induction motor comprising a stator 1 and its windings 2 and a rotor 4 rotating with respect to the stator. A stator winding 2 arranged to the axial grooves of the stator is divided at least into two coil groups for each phase of the supplying alternating voltage operating at a selected basic frequency and it is connected to the supplying alternating voltage in such a manner that the sum of the basic frequency groove currents of the stator is substantially zero at each moment. One end of the motor is indicated with reference D and the other with reference N. In a conventional squirrel-cage induction motor, all the connection wires of the stator winding are conveyed to the D coil end of the motor from which the current is supplied to the stator grooves. This conventional way of supplying different phases of coil groups of the stator winding is illustrated in FIG. 3 from which it is seen that the supply lines of all the coil groups, such as 3A and 3B, are conveyed to the D end of the motor where they are connected to different phases of the supplying alternating voltage. It should be noted that FIG. 3 does not show any operating winding but only illustrates a method of supplying current to the winding.

Figure 2:
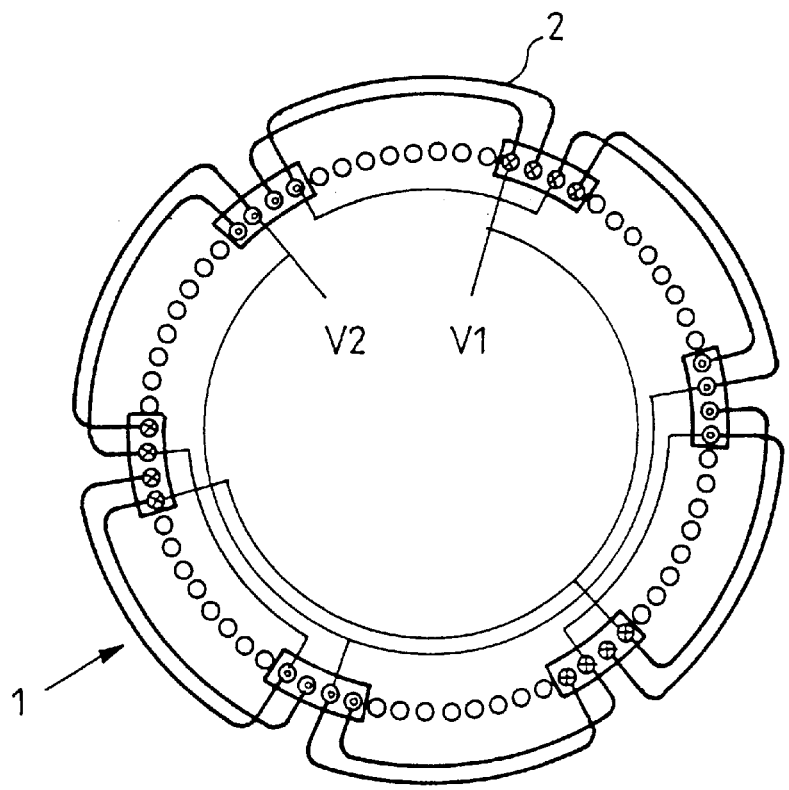
FIG. 2 shows one phase of a distributed single-layer winding of a stator of a conventional squirrel-cage induction motor.

A conventional stator winding 2 and its supply method are also illustrated in FIG. 2 where windings of one phase are connected between phase voltages V1 and V2, in which case the winding sections passing in the axial grooves of the stator are marked by circles and crosses, a circle showing the direction of the current away from the paper and a cross indicating the direction of the current towards the paper. The coil sections passing in the radial direction of the stator form annular coil portions at both ends of the motor.

As was found out earlier, a high-frequency zero current flows from the winding to the grounded frame through spatially distributed stray capacitance, in which case the longitudinal high-frequency current distribution of the motor is non-symmetrical. That is, if all the currents of the stator grooves are added up, their sum is not zero. This axial net current generates to the air gap a corresponding high-frequency zero flux that encircles the shaft. As the shaft is now surrounded by a varying magnet flux, a voltage is induced to it on the basis of the law of induction, the current generated by the voltage trying to oppose the changes in the flux in case the electric circuit closes through the bearings and the frame. In FIG. 1, the generated voltage and the current generated by it are illustrated by a voltage source $V_s$.

Figure 4:
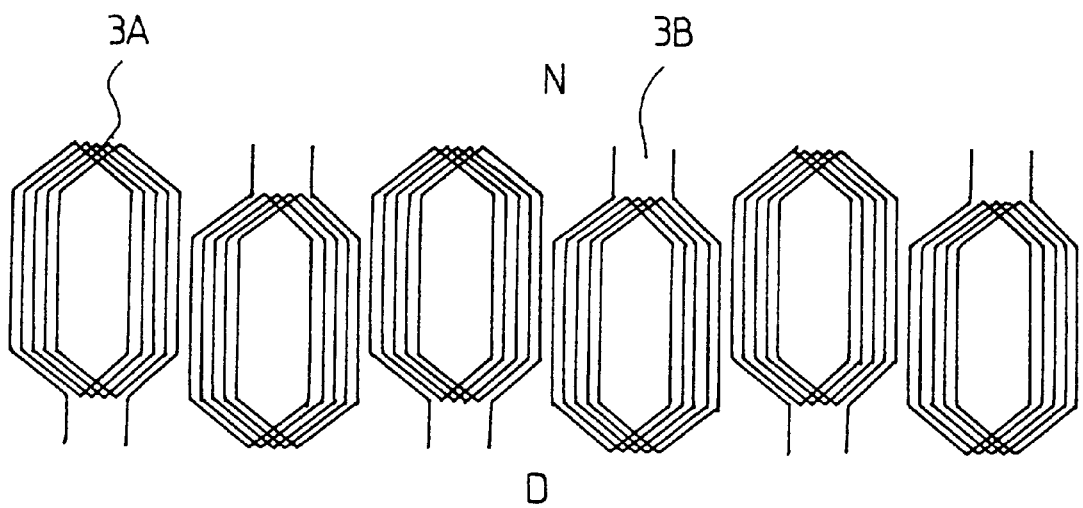
FIG. 4 shows a method of the invention for connecting coil groups of a stator winding.

The effect of the high-frequency zero current flowing in the winding can be cancelled out if the connection method of winding is altered as described in the invention. The basic idea of the connection method of the invention is to render the high-frequency current sum across the stator into zero, too. In practice, this is achieved in such a manner that the current is supplied to the stator grooves equally from both coil ends, in which case the induction effect of the high-frequency common-mode zero current on the shaft is cancelled out and the sum of all both basic and high-frequency currents is zero. As can be seen in FIG. 4, now one half, that is, in practice the portion 3A of the coil groups of each phase is connected to the supplying alternating current at the N end of the stator and the other half, that is, the portion 3B at the other end of the stator, at the D end. One half of the coil groups of the phases is thus inverted in the longitudinal direction, but connected so that the directions of the basic frequency groove currents remain the same when compared with a normal winding. The polarity of the inverted coil groups is thus changed in order to retain the direction of the basic frequency groove currents. As the common-mode zero flux is in phase in all the phases, it is distributed equally in such manner that some of the current flows to the grooves from the N end of the motor and some from the D end, in which case the sum of all currents, with consideration to the direction, is zero at each moment. Then the current distribution is as symmetrical as possible in the longitudinal direction and the net current cannot be generated any more. No longitudinal high-frequency voltage is then induced to the shaft, which voltage could generate the current flowing through the bearings.

Several significant practical advantages are attained with the solution of the invention. One known way of eliminating the current flowing through bearings is to use insulated bearings. Now there is no need to use such insulated bearings, in which case the supplying of these special bearings does not cause any problems to the manufacturer of the motor or to the customer. The solution of the invention does not either cause any significant extra costs to the motor as the use of special bearings does. The solution of the invention does not either have any effect on the other construction, but it can be considered advantageous that symmetrical coil ends also equalize the temperature differences of the motor. The structure of the invention does not raise any need for investing in equipments.

The squirrel-cage induction motor of the invention is described above only on the basis of one exemplary embodiment. It should, however, be understood that in practice, the basic idea of supplying from both ends of coil groups of the stator winding as described in the invention can be applied to all squirrel-cage induction motors.

We claim:

1. A squirrel-cage induction motor for frequency converter comprising:

a stator having axial grooves, a stator winding arranged in each of the axial grooves, said winding being divided into at least two coil groups for each phase of the supplying alternating current operating at a selected basic frequency and connected to the supplying alternating current in such a manner that the sum of basic and high-frequency groove currents is substantially zero at each moment; and a rotor arranged to rotate with respect to the stator, wherein one half of the coil groups of each phase is connected to the supplying alternating current at one end of the stator and the other half of the coil groups of each phase at the other end of the stator.

2. A squirrel-cage, frequency-converter type, multiphase induction motor for connection to an alternating current supply operating at a basic frequency, comprising:

a stator having opposite ends and axial grooves extending between the ends;

a stator winding divided into at least two groups for each phase for connection to the alternating current supply such that the sum of the basic frequency instantaneous currents in each groove is substantially zero; and a rotor arranged for rotation with respect to the stator and wherein one-half of the coil groups of each phase is arranged for connection to the alternating current supply at one end of the stator and the other half of the coil groups of each phase is arranged for connection to the alternating current supply at an opposite end of the stator.

3. The induction motor of claim 2, wherein the rotor is supported in an uninsulated bearing.

4. A squirrel-cage, frequency-converter type, multiphase induction motor for connection to an alternating current supply operating at a basic frequency, comprising:

a stator having opposite ends and axial grooves extending between the ends;

a rotor arranged for rotation with respect to the stator;

a stator winding divided into at least two groups of coils each phase for connection to the alternating current supply;

each group of coils including connection means and being divided equally into first and second halves, and wherein the first half of each coil group of each phase is arranged for connection to the alternating current supply at one end of the stator and the second half of each coil group of each phase is arranged for connection to the alternating current supply at an opposite end of the stator, such that, the sum of the basic frequency instantaneous currents in each groove is substantially zero.

* * * * *